(12) United States Patent
Cheng et al.

(10) Patent No.: US 12,140,436 B2
(45) Date of Patent: Nov. 12, 2024

(54) WAYPOINT IDENTIFICATION IN ASSOCIATION WITH ROUTE NAVIGATION

(71) Applicant: Capital One Services, LLC, McLean, VA (US)

(72) Inventors: Lin Ni Lisa Cheng, New York, NY (US); Kathryn Tikoian, Arlington, VA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 503 days.

(21) Appl. No.: 17/304,521

(22) Filed: Jun. 22, 2021

(65) Prior Publication Data

US 2022/0404156 A1 Dec. 22, 2022

(51) Int. Cl.
*G01C 21/34* (2006.01)
*G06N 5/04* (2023.01)
*G06N 20/00* (2019.01)

(52) U.S. Cl.
CPC ....... *G01C 21/3415* (2013.01); *G01C 21/343* (2013.01); *G01C 21/3484* (2013.01); *G06N 5/04* (2013.01); *G06N 20/00* (2019.01)

(58) Field of Classification Search
CPC .............. G01C 21/3415; G01C 21/343; G01C 21/3644; G01C 21/3811; G01C 21/3484; G06N 5/04; G06N 20/00
See application file for complete search history.

(56) References Cited

U.S. PATENT DOCUMENTS

| | | | |
|---|---|---|---|
| 10,830,605 B1* | 11/2020 | Chintakindi | G01C 21/3484 |
| 2008/0165032 A1* | 7/2008 | Lee | G01C 21/3484 |
| | | | 340/988 |
| 2014/0278070 A1* | 9/2014 | McGavran | G01C 21/362 |
| | | | 701/538 |
| 2016/0047662 A1 | 2/2016 | Ricci | |
| 2017/0108348 A1* | 4/2017 | Hansen | H04W 4/024 |
| 2017/0328725 A1* | 11/2017 | Schlesinger | G01C 21/3438 |
| 2017/0363432 A1* | 12/2017 | Hall | B67D 7/04 |
| 2019/0186934 A1* | 6/2019 | Lee | G01C 21/3617 |
| 2021/0293565 A1* | 9/2021 | Reed | G01C 21/3461 |

* cited by examiner

*Primary Examiner* — Keith D Bloomquist
(74) *Attorney, Agent, or Firm* — Harrity & Harrity, LLP

(57) ABSTRACT

In some implementations, a system may identify, using a machine learning model, a pattern of events based on account information associated with a user. The system may generate a prediction of a time period during which a predicted event, associated with the pattern of events, is predicted to occur. The system may receive an indication that a vehicle, associated with the user, is to travel a route from a starting location to an ending location during the time period. The system may identify a physical location associated with the predicted event based on a location associated with the vehicle or based on the route. The system may generate a new route that includes the starting location, the physical location as a waypoint along the new route, and the ending location. The system may transmit information that identifies the new route to a device associated with the vehicle.

20 Claims, 8 Drawing Sheets

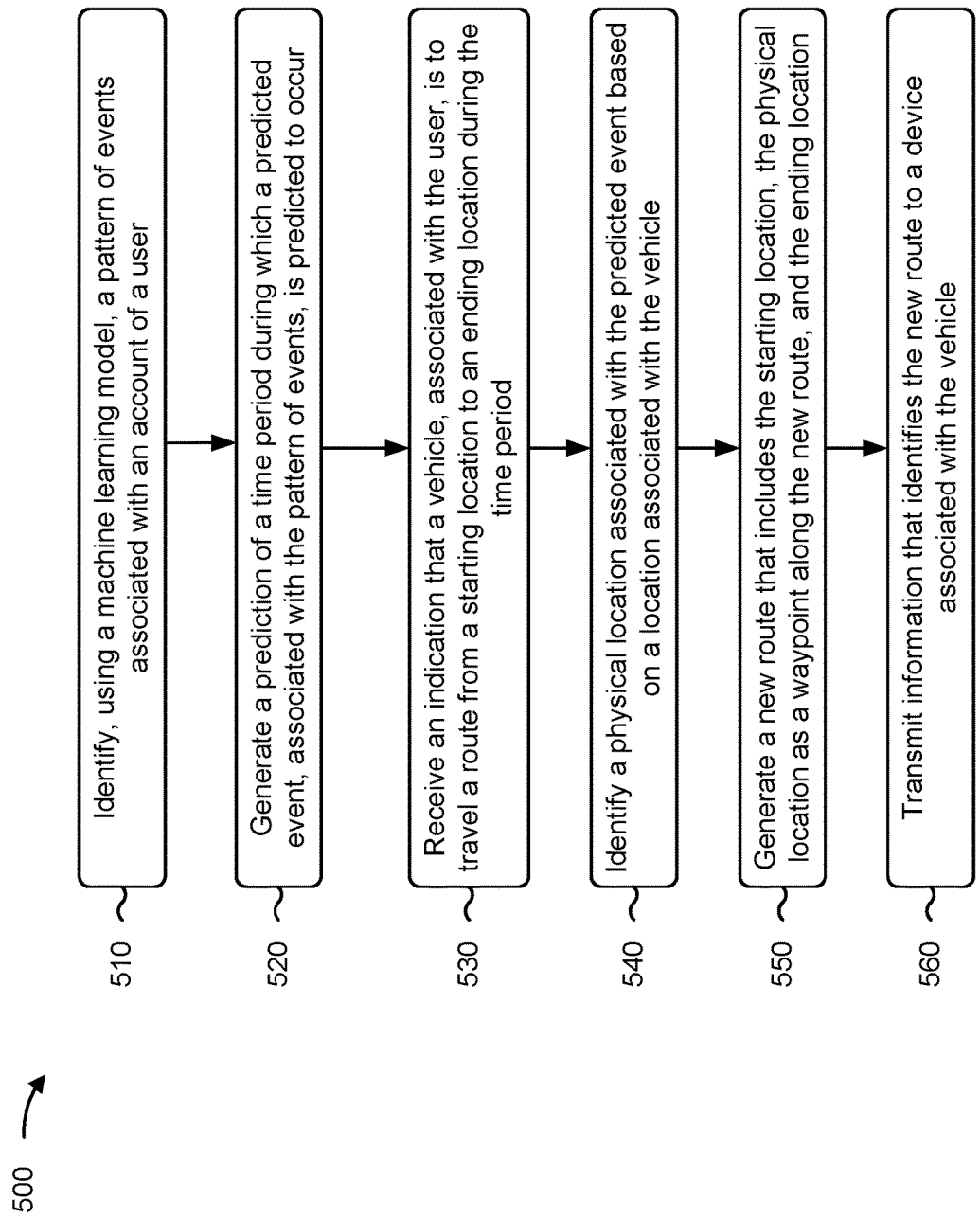

WAYPOINT IDENTIFICATION IN ASSOCIATION WITH ROUTE NAVIGATION

BACKGROUND

A waypoint may be a stopping point (or place) or an intermediate point (or place) on a route of travel. A waypoint may be defined by a set of coordinates that identify a point in physical space. For example, a set of coordinates for terrestrial navigation may include longitude and latitude. As another example, a set of coordinates for air navigation may include longitude, latitude, and altitude. Waypoints may be used in navigation systems, such as the Global Positioning System (GPS) and other types of radio navigation.

SUMMARY

In some implementations, a system for waypoint identification in association with route navigation includes one or more memories and one or more processors communicatively coupled to the one or more memories. The one or more processors may be configured to identify, using a machine learning model, a series of recurring events associated with an account of a user; generate a prediction of a time period during which a predicted event, associated with the series of recurring events, is predicted to occur; receive an indication that a vehicle, associated with the user, is to travel a route from a starting location to an ending location during the time period; identify a physical location, associated with the predicted event, based on a location of the vehicle; generate a new route that includes the starting location, the physical location as a waypoint along the new route, and the ending location; determine that the new route satisfies a condition; and transmit information that identifies the new route to a device associated with the vehicle based on determining that the new route satisfies the condition.

In some implementations, a method for waypoint identification in association with route navigation includes identifying, by a system and using a machine learning model, a pattern of events based on account information associated with a user; generating, by the system, a prediction of a time period during which a predicted event, associated with the pattern of events, is predicted to occur; receiving, by the system, an indication that a vehicle, associated with the user, is to travel a route from a starting location to an ending location during the time period; identifying, by the system, a physical location associated with the predicted event based on a location associated with the vehicle or based on the route; generating, by the system, a new route that includes the starting location, the physical location as a waypoint along the new route, and the ending location; and transmitting, by the system, information that identifies the new route to a device associated with the vehicle.

In some implementations, a non-transitory computer-readable medium stores a set of instructions that, when executed by one or more processors of a system, cause the system to identify, using a machine learning model, a pattern of events associated with an account of a user; generate a prediction of a time period during which a predicted event, associated with the pattern of events, is predicted to occur; receive an indication that a vehicle, associated with the user, is to travel a route from a starting location to an ending location during the time period; identify a physical location associated with the predicted event based on a location associated with the vehicle; generate a new route that includes the starting location, the physical location as a waypoint along the new route, and the ending location; and transmit information that identifies the new route to a device associated with the vehicle.

BRIEF DESCRIPTION OF THE DRAWINGS

FIG. 5 is a flowchart of an example process relating to waypoint identification in association with route navigation.

DETAILED DESCRIPTION

Figure 1A:
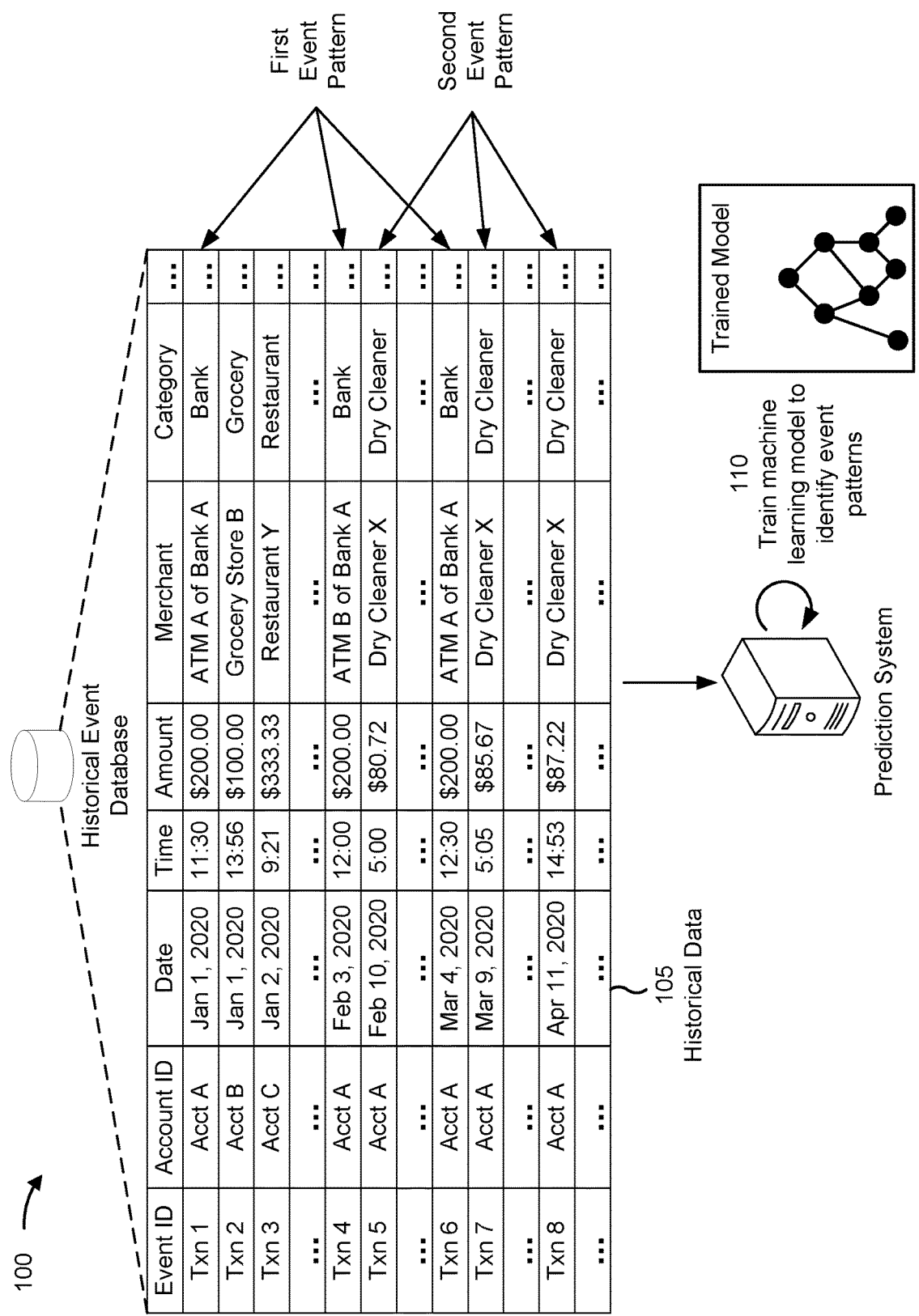
FIGS. 1A-1D are diagrams of an example implementation relating to waypoint identification in association with route navigation.

The following detailed description of example implementations refers to the accompanying drawings. The same reference numbers in different drawings may identify the same or similar elements.

A navigation system may use a global navigation satellite system (GNSS), such as the Global Positioning System (GPS), to provide navigation for a route. For example, a user device or a vehicle may be equipped with a navigation system to assist with navigating roads from a starting location to an ending location. For a non-autonomous or semi-autonomous vehicle, the navigation system may output route information, for presentation by a user device, to assist a user (e.g., a driver) with navigating the route. For an autonomous vehicle, the navigation system may output route information to one or more control systems of the autonomous vehicle to enable the vehicle to traverse the route.

Some routes may include a waypoint as an intermediate location along the route. In these cases, the navigation system may assist with navigation from the starting location to the waypoint, and the vehicle may stop at the waypoint for a time period (e.g., while the user performs an activity at the intermediate location). After the time period, the navigation system may assist with navigation from the waypoint to the ending location. Incorporating waypoints into a route for a single trip may be less computationally and logistically complex than determining routes for separate trips, such as a first trip from the starting location to the waypoint and back to the starting location, and a second trip at a different time from the starting location to the ending location and back to the starting location. As a result, using waypoints may conserve computing resources (e.g., memory resources, processing resources, and/or battery power) of a navigation system, may reduce wear and tear on a vehicle used for the trip, and may conserve energy needed to fuel the vehicle. Thus, it would be beneficial to identify and recommend waypoints along a route as compared to determining multiple routes for separate trips.

However, identifying a relevant waypoint is technically difficult. A navigation system could use historical route information to identify locations frequently visited by a user and times when those visits occur to identify and recommend a relevant waypoint for an upcoming or ongoing trip, but this historical route information would be unavailable for users who don't always use navigation systems (which is frequently the case for routine trips or trips close to a user's home, where waypoint identification may be particularly useful). Some implementations described herein enable identification and recommendation of relevant waypoints using historical transaction data associated with a user.

For example, a prediction system may use data mining and/or machine learning to identify a pattern of transactions (e.g., a series of recurring transactions). The prediction system may identify a physical location and a time period associated with an upcoming event or transaction that is associated with the pattern of transactions. Then, when a navigation system is determining a route for a user within that time period, the prediction system may recommend that the physical location be added to the route as a waypoint. In this way, computing resources (e.g., memory resources, processing resources, and/or battery power) of the navigation system may be conserved (as compared to calculating routes for separate trips), wear and tear on the vehicle may be reduced (as compared to making separate trips), and energy needed to fuel the vehicle may be conserved. In some implementations, the prediction system may use machine learning to generate accurate and relevant predictions, which may conserve network resources used to transmit information that identifies a recommend waypoint, as compared to a system that generates less accurate predictions and transmits corresponding recommendations more often (e.g., by transmitting recommendations generated based on less relevant predictions).

FIGS. 1A-1D are diagrams of an example 100 relating to waypoint identification in association with route navigation. As shown in FIGS. 1A-1D, example 100 includes a prediction system, a historical event database, a current event database, an account database, a vehicle (which may be equipped with a navigation system), a user device (which may be equipped with a navigation system), and an entity device. These devices and systems are described in more detail in connection with FIGS. 3 and 4.

As shown in FIG. 1A, and by reference number 105, a historical event database may store historical data relating to events that have already occurred (e.g., historical events). In some implementations, an event may include an exchange or a transaction between a user and an entity. An entity may be a merchant or a financial institution (e.g., a bank), among other examples. For example, an event may be transaction (e.g., a purchase or sale of a good and/or a service) that occurs between a user and a merchant, using an account of the user. As another example, an event may be a transaction that occurs between a user and a financial institution, using an account (e.g., a financial account) of the user, such as a withdrawal of funds from the account of the user. Thus, the historical event database may be a transaction database and/or may store account information (e.g., transaction data for one or more transactions performed using the account, such as the data shown in FIG. 1A) associated with one or more user accounts, in some implementations.

As shown in FIG. 1A, the historical event database may store event data for each event that is recorded or stored in the historical event database. In example 100, the event data is transaction data for a transaction. In this example, an entry (e.g., account information or transaction data) for an event may indicate an event identifier (e.g., a transaction identifier) (shown as Event ID), a transaction account identifier (shown as Account ID), a transaction date indicator (shown as Date), a transaction time indicator (shown as Time), a transaction amount indicator (shown as Amount), a merchant identifier (shown as Merchant), and/or a merchant category identifier (shown as Category), among other examples.

As further shown in FIG. 1A, the historical data may include one or more sets of entries respectively associated with one or more event patterns. An event pattern may be a pattern of occurrence or reoccurrence of an event over time. For example, an event pattern may indicate a pattern for a recurring event that occurs on a recurring basis (e.g., daily, weekly, monthly, semiannually, or annually). For example, as shown in FIG. 1A, the historical data may include a first set of entries associated with a first event pattern. The first event pattern may indicate a first series of recurring events associated with an account that has a transaction account identifier of Acct A and a merchant that has a merchant identifier of Bank A and/or a particular automated teller machine (ATM) of Bank A, shown as ATM A. As shown, the first event pattern includes transactions with event identifiers of Txn 1, Txn 4, and Txn 6. The first set of entries indicate that the first series of recurring events are each associated with the same transaction amount of $200.00 (e.g., an ATM withdrawal of $200.00) and occurred around the same time every month (e.g., within the first four days of each month, on Jan. 1, 2020, Feb. 3, 2020, and Mar. 4, 2020) at approximately the same time (e.g., within the same hour, at 11:30 AM, 12:00 PM, and 12:30 PM).

As further shown in FIG. 1A, the historical data may include a second set of entries associated with a second event pattern. The second event pattern may indicate a second series of recurring events associated with the account that has a transaction account identifier of Acct A and a merchant that has a merchant identifier of Dry Cleaner X. As shown, the second event pattern includes transactions with event identifiers of Txn 5, Txn 7, and Txn 8. The second set of entries indicate that the second series of recurring events are associated with approximately equal transaction amounts (e.g., within a threshold amount of, for example, $10) and occurred monthly around the same time period (e.g., in the range of the $9^{th}$-$11^{th}$ day of each month, on Feb. 10, 2020 at 5:00 AM; Mar. 9, 2020 at 5:05 AM; and Apr. 11, 2020 at 2:53 PM). While these examples are associated with series of recurring events that are associated with a single account (e.g., that has the account identifier of Acct A), the historical data may include series of recurring events associated with multiple different accounts (e.g. that are associated with multiple different users and/or a single user).

As further shown in FIG. 1A, and by reference number 110, the prediction system may train a machine learning model to identify event patterns (e.g., recurring events) based on the historical data. For example, the prediction system may communicate with the historical event database to access and/or to obtain the historical data. The historical data may be training data and/or labeled data used to train a machine learning model. For example, the historical data may be labeled to indicate events that are associated with an event pattern, such as the first set of entries associated with the first event pattern, the second set of entries associated with the second event pattern, and so on.

The prediction system may train the machine learning model based on account information included in the one or more entries (e.g., that are respectively associated with one or more events) of the historical data and/or additional information, such as indications of sets of entries, of the one or more entries, that are respectively associated with series of recurring events; statistical information associated with the series of recurring events (e.g., an average time between events included in a series of recurring events, a standard deviation determined for times between events included in a series of recurring events, an average transaction amount associated with a series of recurring events, and/or a standard deviation determined for transaction amounts of a series of recurring events); and/or confidence scores that respectively indicate a confidence level that a set of entries is associated with a series of recurring events. Using the historical data and/or the additional information as inputs to the machine learning model, the prediction system may determine a confidence score that an entry or set of entries is associated with an event pattern (e.g., a recurring event or a series of recurring events). In this way, the prediction system may train the machine learning model to accurately identify an event pattern that is associated with an account, which may then be used in connection with waypoint identification for route navigation, as described in more detail herein. In some implementations, the machine learning model may be trained and/or used as described below in connection with FIG. 2.

Figure 1B:
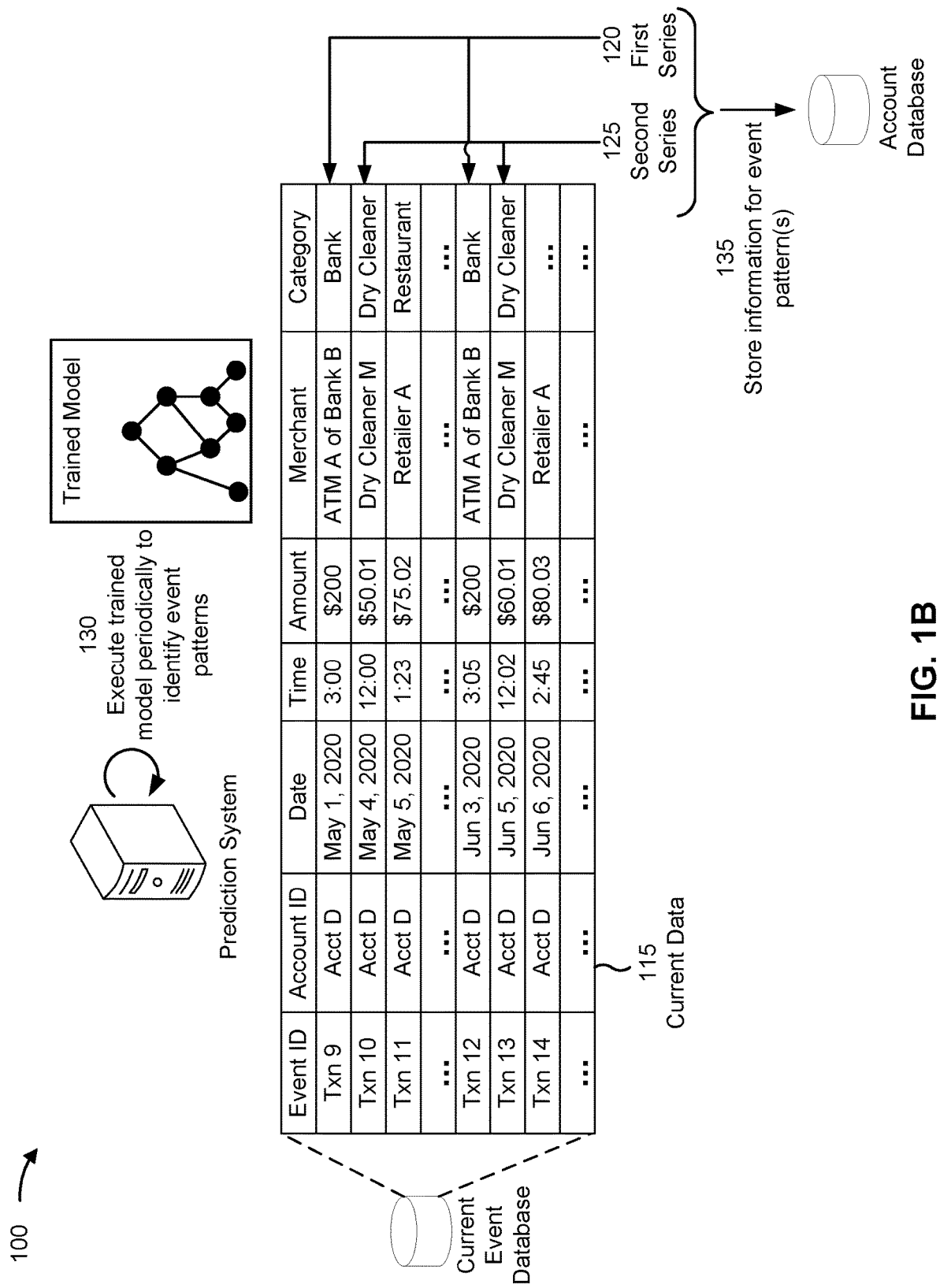

As shown in FIG. 1B, and by reference number 115, the event database may store current data. The current data may include one or more entries respectively associated with one or more events (e.g., one or more current events) that are not included in the historical data (e.g., one or more entries that have not been used to train the machine learning model). For example, the current data may be unlabeled data that does not include labels indicating whether particular events are associated with an event pattern. In some implementations, an entry of the current data may include event data as described above in connection with FIG. 1A. For example, as shown in FIG. 1B, when an event is associated with a transaction of a financial account, an entry of the current data that is associated with the event may include an event identifier (e.g., a transaction identifier), a transaction account identifier, a transaction date indicator, a transaction time indicator, a transaction amount indicator, a merchant identifier, and/or a merchant category identifier. In some implementations, the current data may include entries associated with many different events (e.g., that are associated with different accounts and/or merchants).

In some implementations, the current data may include one or more sets of entries respectively associated with one or more series of recurring events. For example, as shown in FIG. 1B, the current data may include multiple entries that are associated with an account that has a transaction account identifier of Acct D (e.g., entries with event identifiers Txn 9 through 14). As shown by reference number 120, the current data may include a first set of entries, of the multiple entries, associated with a first series of recurring events that are associated with a merchant that has a transaction merchant identifier of Bank B (and/or a particular ATM of Bank B, such as ATM A of Bank B). As shown by reference number 125, the current data may include a second set of entries, of the multiple entries, associated with a second series of recurring events that are associated with a merchant that has a transaction merchant identifier of Dry Cleaner M. The first set of entries (e.g., entries with event identifiers Txn 9 and Txn 12) indicate that the first series of recurring events are associated with transaction amounts of $200 and occurred monthly within the same time period (e.g., within the first 3 days of the month), on May 1, 2020 at 3:00 PM and Jun. 1, 2020 at 3:05 PM. The second set of entries (e.g., entries with event identifiers Txn 10 and Txn 13) indicate that the second series of recurring events are associated with transaction amounts that are within a threshold (e.g., a threshold of $10, $15, $20, or the like) and occurred monthly within a range of days of the month (e.g., within the $4^{th}$-$5^{th}$ day of the month, on May 4, 2020 and Jun. 5, 2020). While these examples are associated with series of recurring events that are associated with a single account (e.g., that has the account identifier of Acct D), the current data may include series of recurring events associated with multiple different accounts (e.g. that are associated with multiple different users).

As further shown in FIG. 1B, and by reference number 130, the prediction system may execute the machine learning model (e.g., that is trained as described in connection with FIG. 1A and/or FIG. 2) to identify a series of recurring events in the current data. For example, the prediction system may communicate with the current event database to access and/or to obtain the current data, and the prediction system may process the current data to identify a series of recurring events (e.g., that are associated with an account). The prediction system may provide the current data as input to the trained machine learning model, and the trained machine learning model may identify the first set of entries that are associated with the first series of recurring events (e.g., that are associated with Acct D) and/or the second set of entries that are associated with the second series of recurring events (e.g., that are associated with Acct D). In some implementations, the prediction system may periodically (e.g., every 30 minutes, 2 hours, 12 hours, or 24 hours) execute the trained machine learning model. In this way, the prediction system may timely identify a series of recurring events, that are associated with an account of a user, that can be used to recommend waypoints for a trip of the user, as described elsewhere herein.

As further shown in FIG. 1B, and by reference number 135, the prediction system may store information relating to one or more series of recurring events that are associated with an account (e.g., that was identified by the prediction system) in an account database associated with the account. For example, the prediction system may store, in an account database associated with Acct D and/or associated with all accounts (e.g., of a financial institution), the first set of entries of the current data that are associated with the first series of recurring events and/or the second set of entries of the current data that are associated with the second series of recurring events.

Although the example of FIG. 1B shows the prediction system identifying a pattern of transactions associated with a particular entity (e.g., the first pattern of transactions is associated with a particular bank and the second pattern of transactions is associated with a particular dry cleaner), in some implementations, the prediction system may identify a pattern of transactions associated with a set of entities associated with a particular entity category (e.g., banks, dry cleaners, restaurants, grocery stores, or the like). In some implementations, this may enable the prediction system to select an entity from a larger set of entities to recommend a waypoint that is more convenient to a route of travel, as described in more detail elsewhere herein.

Figure 1C:
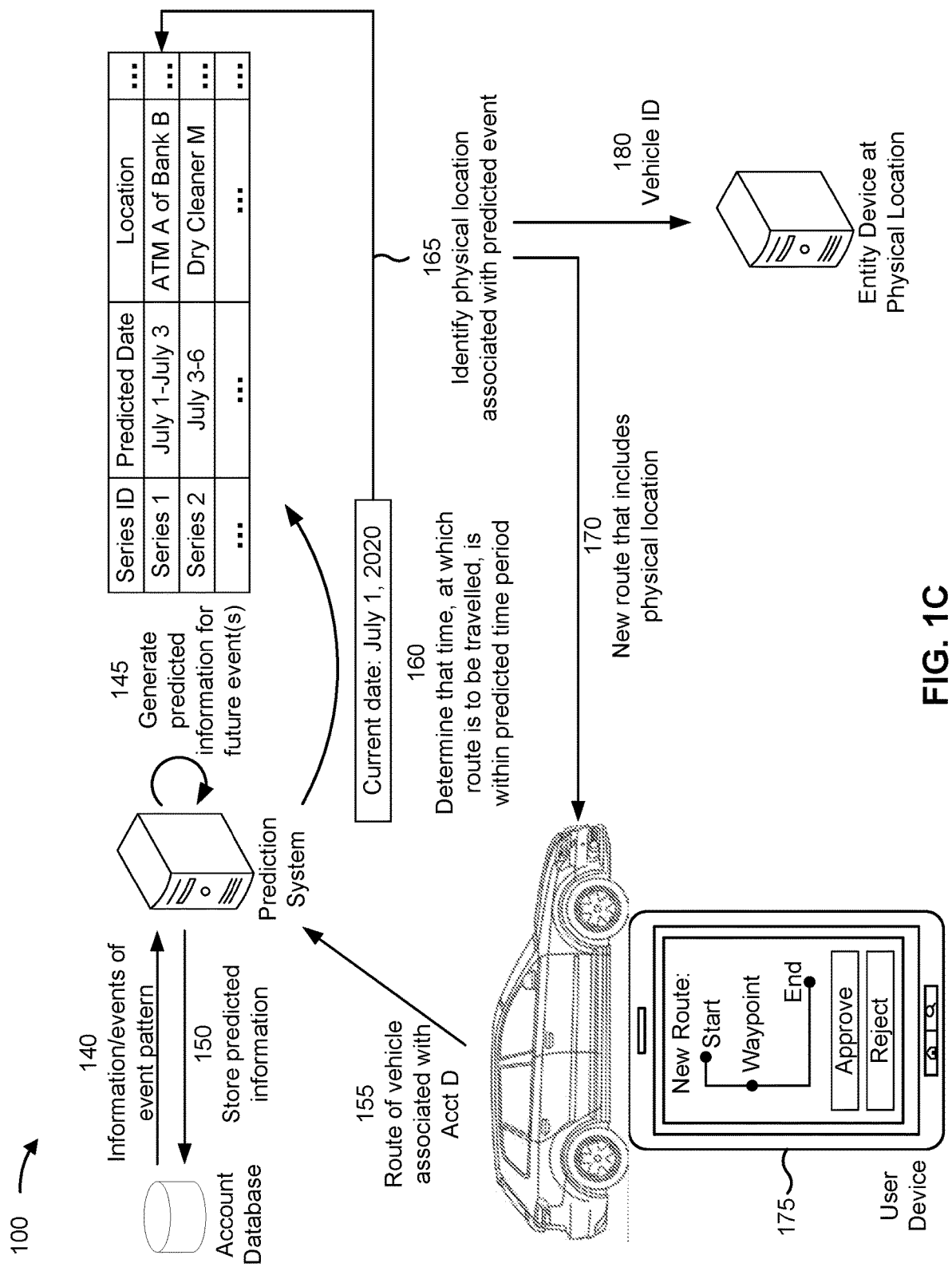

As shown in FIG. 1C, and by reference number 140, the prediction system may communicate with the account database to access and/or obtain information relating to one or more series of recurring events that are associated with an account. For example, the prediction system may communicate with an account database that is associated with Acct D to access and/or to obtain the first set of entries of the current data that are associated with the first series of recurring events and/or the second set of entries of the current data that are associated with the second series of recurring events (e.g., that were identified by the prediction system, as described above in connection with FIG. 1B). In some implementations, the sets of entries stored in the account database may be labeled according to an event pattern or series of recurring events with which the sets of entries are associated. For example, the first series of events may be labeled with a first event pattern identifier (shown as a series identifier of "Series 1") that indicates that the first series of events are related to one another (e.g., as part of an event pattern or a series of recurring events), the second series of events may be labeled with a second event pattern identifier (shown as a series identifier of "Series 2") that indicates that the second series of events are related to one another, and so on.

As further shown in FIG. 1C, and by reference number 145, the prediction system may generate predicted information for one or more future events for the account (e.g., based on the information relating to one or more series of recurring events that are associated with the account). In some implementations, the prediction system may provide the information relating to one or more series of recurring events that are associated with the account to the machine learning model (e.g., that was trained as described in connection with FIG. 1A and/or FIG. 2 and/or that was used to identify a series of recurring events as described in connection with FIG. 1B) and may execute the machine learning model to generate a predicted time period (e.g., a prediction of a future date or range of dates on which a predicted event, associated with a series of recurring events, is to occur) and/or a physical location associated with a predicted event. Additionally, or alternatively, the machine learning model may be used to identify event patterns, and then the prediction system may use event data associated with events included in those event patterns to determine a predicted time period and/or a physical location associated with a predicted event. In some implementations, the pattern of events is a pattern of transactions (e.g., a recurring series of events may be a recurring series of transactions) and the predicted event is a predicted transaction.

For example, as shown in FIG. 1C, the prediction system may process the first set of entries of the current data that are associated with the first series of recurring events to generate a first prediction of a first predicted time period (e.g., between Jul. 1, 2020 and Jul. 3, 2020) on which a first predicted event (e.g., a transaction), associated with the first series of recurring events (Series 1), is to occur. In some implementations, the prediction system may generate the first prediction based on the range of time periods in which events in the series occurred. For example, the first series of recurring events occurred between the $1^{st}$ and $3^{rd}$ days of each month, and the prediction system uses this information to predict that the next event will occur between the $1^{st}$ and $3^{rd}$ days of each month.

As another example, the prediction system may process the second set of entries of the current data that are associated with the second series of recurring events to generate a second prediction of a second predicted time period (e.g., Jul. 3, 2020 through Jul. 6, 2020) on which a second predicted event (e.g., a transaction), associated with the second series of recurring events (Series 2), is to occur. In some implementations, the prediction system may expand the range of time periods, in which events in the series of events occurred, to generate the predicted time period. For example, the second series of recurring events occurred in the range of the $4^{th}$ and $5^{th}$ days of each month, and the prediction system expands this range to one day earlier and one day later to predict that the next event will occur between the $3^{rd}$ and $6^{th}$ days of each month.

Additionally, or alternatively, the prediction system may identify a physical location associated with a predicted event. For example, the prediction system may use transaction data, such as a merchant identifier and/or a transaction location (e.g., a zip code, a city, and/or a state) to identify a physical location where events in the series of recurring events occurred. The physical location may be associated with an entity that is associated with a predicted event (e.g., a predicted transaction), such as a merchant or financial institution associated with a predicted transaction. In some implementations, the prediction system may store an indication of whether all events in the series of recurring events occurred at the same location (e.g., the same dry cleaner, the same grocery store, or the like) or whether different events in the series of recurring events occurred at different locations (e.g., different ATMs, different restaurants, different grocery stores, or the like). The prediction system may use this indication when recommending a waypoint. For example, if all events in the series of recurring events occur in a particular physical location (e.g., a particular dry cleaner), then the prediction system may refrain from recommending a physical location other than that particular physical location (e.g., may refrain from recommending a different dry cleaner, even if it would result in a shorter route). Alternatively, if different events in the series of recurring events occur in different physical locations (e.g., at different ATMs), then the prediction system may recommend a closest physical location (or a physical location that adds the least amount of time to a route) as a waypoint.

As further shown in FIG. 1C, and by reference number 150, the prediction system may store the predicted information (e.g., that was determined by the prediction system) in the account database associated with the account. For example, the prediction system may store, in the account database associated with Acct D, a first entry that includes the first prediction (e.g., that includes the first predicted event, the first predicted time period, the first physical location, and/or a first confidence score associated with the first prediction) and/or a second entry that includes the second prediction (e.g., that includes second predicted event, the second predicted time period, the second physical location, and/or a second confidence score associated with the second prediction).

As shown by reference number 155, the prediction system may receive an indication of a route of a vehicle associated with a particular user and/or a particular account. For example, the indication may indicate that a vehicle, associated with a user, is to travel a route from a starting location to an ending location. In some implementations, the prediction system may receive the indication from a user device of the user (e.g., a smart phone). For example, the user may interact with the user device to load a navigation application, which may communicate with the prediction system. The user device may transmit, to the prediction system, an indication of a starting location for a route (e.g., the current location of the user device) and an ending location for the route (e.g., a destination, which may be input by the user). Additionally, or alternatively, the prediction system may receive the indication from a navigation system, which may be integrated into and/or in communication with the vehicle. In this example, the navigation system may transmit, to the prediction system, an indication of a starting location for a route and an ending location for the route.

Additionally, or alternatively, the user device and/or the navigation device may transmit an indication of a location of the vehicle to the prediction system. For example, the navigation system may be equipped with GPS, and may indicate a GPS location of the vehicle to the prediction system. Additionally, or alternatively, the user device may be equipped with GPS, and may indicate a GPS location of the user device (which may be located in or near the vehicle) to the prediction system. Additionally, or alternatively, the user device and/or the navigation system may transmit a user identifier to the prediction system. For example, a user may register for a navigation service, provided by the prediction system, using a user identifier, and may associate that user identifier with the navigation system and/or the user device (e.g., a navigation application installed on the user device). The prediction system may use the user identifier to look up an account and corresponding predicted information associated with the user.

As shown by reference number 160, the prediction system may determine whether the time at which the route is to be travelled is within a predicted time period for an event associated with the user. For example, the prediction system may use a user identifier, received from the navigation system or the user device, to identify predicted information associated with the user. For example, the predicted information may be stored in connection with the user identifier and/or an account identifier associated with the user identifier. Upon identifying the predicted information associated with the user, the prediction system may determine if a time that the route is to be travelled (e.g., a current time if route information is received in real-time, or a future time if route information is for a future planned route) is within any predicted time period associated with the user. If not, then the prediction system may inform the user device and/or the navigation system to proceed with navigation without indicating any waypoints.

As shown by reference number 165, if the time at which the route is to be travelled is within a predicted time period, then the prediction system may identify a physical location associated with that predicted time period (e.g., a physical location associated with a predicted event that is predicted to occur during the time period). In FIG. 1C, a route is about to be traveled on Jul. 1, 2020, and this falls within a range of dates from Jul. 1, 2020 through Jul. 3, 2020, which is associated with Series 1. In this example, the series of events is associated with an ATM visit. Thus, in this case, the prediction system identifies ATM A as a physical location for the predicted event. In some implementations, the prediction system may identify the physical location based on the location of the vehicle, the location of the user device, and/or the route (e.g., the starting location, the ending location, and/or one or more locations along the route). For example, the prediction system may identify a physical location, associated with a merchant that is associated with the predicted event, that is nearest in location to the starting location, the ending location, the vehicle location, and/or the user device location. Additionally, or alternatively, the prediction system may identify a physical location, associated with a merchant that is associated with the predicted event, that adds a smallest amount of travel time to the route as compared to other physical locations associated with the merchant.

As shown by reference number 170, the prediction system may generate and transmit a new route, that includes the identified physical location, to a device associated with the vehicle, such as the navigation system and/or the user device. The new route may include, for example, the starting location, the physical location as a waypoint (e.g., an intermediate location along the route), and the ending location. In some implementations, the prediction system may generate and/or transmit the new route only if a condition is satisfied. For example, the prediction system may generate and/or transmit the new route only if a difference between a first travel time of the original route (e.g., transmitted by the navigation system and/or the user device to the prediction system) and a second travel time of the new route is less than or equal to a threshold. In this way, the prediction system may only recommend waypoints that do not add significant travel time to a route.

Additionally, or alternatively, the prediction system may generate and/or transmit the new route based on an indication that the vehicle is carrying only the user and no other people (e.g., that the user is travelling alone). For example, the user may provide input to the user device indicating whether the user is travelling alone in the vehicle or is sharing the vehicle with one or more other passengers, and the user device may provide this indication to the prediction system. Additionally, or alternatively, the vehicle may include one or more sensors (e.g., weight sensors, occupancy sensors, sensors to detect a quantity of user devices located in the vehicle, or the like) capable of determining a quantity of vehicle occupants and/or capable of determining whether the user is travelling alone in the vehicle. The vehicle may use a communication component of the vehicle (e.g., a navigation system) to provide this indication to the prediction system. In this way, the prediction system may refrain from recommending waypoints relevant to a single person if multiple people are traveling in the vehicle, such as in the case of ride-sharing. In some implementations, the user may provide input to override this function of the prediction system (e.g., to indicate that the multiple passengers are traveling together or are part of the same family). In some implementations, the prediction system may recommend one or more waypoints based on predicted information for multiple passengers in the vehicle, as described in more detail below in connection with FIG. 1D.

Additionally, or alternatively, the condition for generating and/or transmitting the new route may be based on the ending location of the route and/or an estimated time of arrival at the ending location. For example, if the ending location is a user's work address, then the prediction system may refrain from generating and/or transmitting a new route (e.g., so that the user will not be late to work). As another example, if the ending location is a user's work address and the estimated time of arrival is within a threshold amount of time (e.g., 10 minutes, 5 minutes, 0 minutes) of a starting time at which the user starts work (e.g., 9:00 AM), then the prediction system may refrain from generating and/or transmitting the new route (e.g., so that the user will not be late to work). In some implementations, the prediction system may obtain the work address and/or the starting time at which the user starts work from the user device and/or a user preferences database that stores preferences associated with the user. In some implementations, the prediction system may calculate an estimated time of arrival based on the new route that includes the waypoint (and/or an amount of time for performing an action at the waypoint, such as withdrawing cash from an ATM, picking up dry cleaning, or the like), and may transmit the new route only if the estimated time of arrival satisfies a condition (e.g., is before a starting time at which the user starts work). In some implementations, the prediction system may store indications of different amounts of time for different actions, and may use those stored amounts of time to estimate the time of arrival.

As shown by reference number 175, the user device (and/or the navigation system of the vehicle) may provide the new route for display. For example, the new route may be presented via a user interface, and may be used for navigation. In some implementations, the user device and/or the navigation system may prompt the user to provide input to approve or reject the new route. If the user provides input to approve the new route, then the new route may be used for navigation. If the user provides input to reject the new route, then the original route (e.g., with the starting location and the ending location, but without the physical location as a waypoint) may be used for navigation.

As shown by reference number 180, the prediction system may transmit, to an entity device associated with the physical location, a vehicle identifier of the vehicle. In some implementations, the prediction system may receive the vehicle identifier (e.g., a vehicle identifier number (VIN), a license plate number, a radiofrequency identifier tag associated with one or more components of the vehicle, or the like) from the navigation system and/or the user device (e.g., which may store the vehicle identifier based on input from a user or receive the vehicle identifier based on communicating with one or more communication components of the vehicle). The prediction system may transmit the vehicle identifier to the entity device based on transmitting the new route to the user device and/or the navigation system, and/or based on receiving an indication (e.g., from the user device and/or the navigation system) that the new route has been approved. The entity device may use the vehicle identifier to assist with performing an action in connection with the predicted event (e.g., to authenticate the vehicle and/or the user, to identify the vehicle and/or the user, or the like).

As an example, the prediction system may determine, based on events (e.g., transactions) stored in an event database (e.g., a transaction database), that the user associated with the account typically visits an ATM around the beginning of each month (e.g., on the $1^{st}$, $2^{nd}$ or $3^{rd}$ day of each month). In some implementations, the prediction system may determine, based on event data and/or transaction data, that the user visits the same ATM, that the user visits an ATM associated with the same financial institution, or that the user visits an ATM associated with a set of financial institutions. When the prediction system receives an indication that the user is to travel a route on the $1^{st}$, $2^{nd}$ or $3^{rd}$ day of a month, the prediction system may identify a physical location of a particular ATM, and may recommend that physical location as a waypoint. For example, if the user typically (e.g., more than a threshold percentage of the time) visits the same ATM (e.g., at a particular physical location), then the prediction system may identify that ATM or that particular physical location. Alternatively, the prediction system may identify multiple ATMs associated with a particular financial institution or set of financial institutions, and may select an ATM of those multiple ATMs based on the vehicle location, the user device location, and/or the route, in a similar manner as described above. If the prediction system recommends an ATM as a waypoint, then the prediction system may transmit a vehicle identifier to the selected ATM, which may then be used for authentication at the ATM (e.g., using computer vision to read a license plate of the vehicle, using a communication device to receive a vehicle identifier of the vehicle, or the like).

Similar techniques described above can be used to identify a physical location of another merchant (e.g., a retailer, a service provider, or the like). For example, the prediction system may identify a particular merchant (e.g., a particular grocery store or a particular restaurant) at a particular physical location, may identify a physical location of a merchant that is part of a chain of merchants (e.g., a chain of grocery stores having the same brand or owned by the same company), or may identify a physical location of a merchant belonging to a particular merchant category (e.g., any grocery store). In some implementations, the user may input one or more preferences to indicate whether the user prefers selection of a particular merchant, a particular chain of merchant, or any merchant from a merchant category. The prediction system may use this preference to select a physical location based on one or more user preferences. Furthermore, if the vehicle is carrying multiple users (as described in more detail below in connection with FIG. 1D), then the prediction system may analyze account information for each of the users to identify a physical location (e.g., a type of merchant or a particular merchant that each user has transacted with).

Figure 1D:
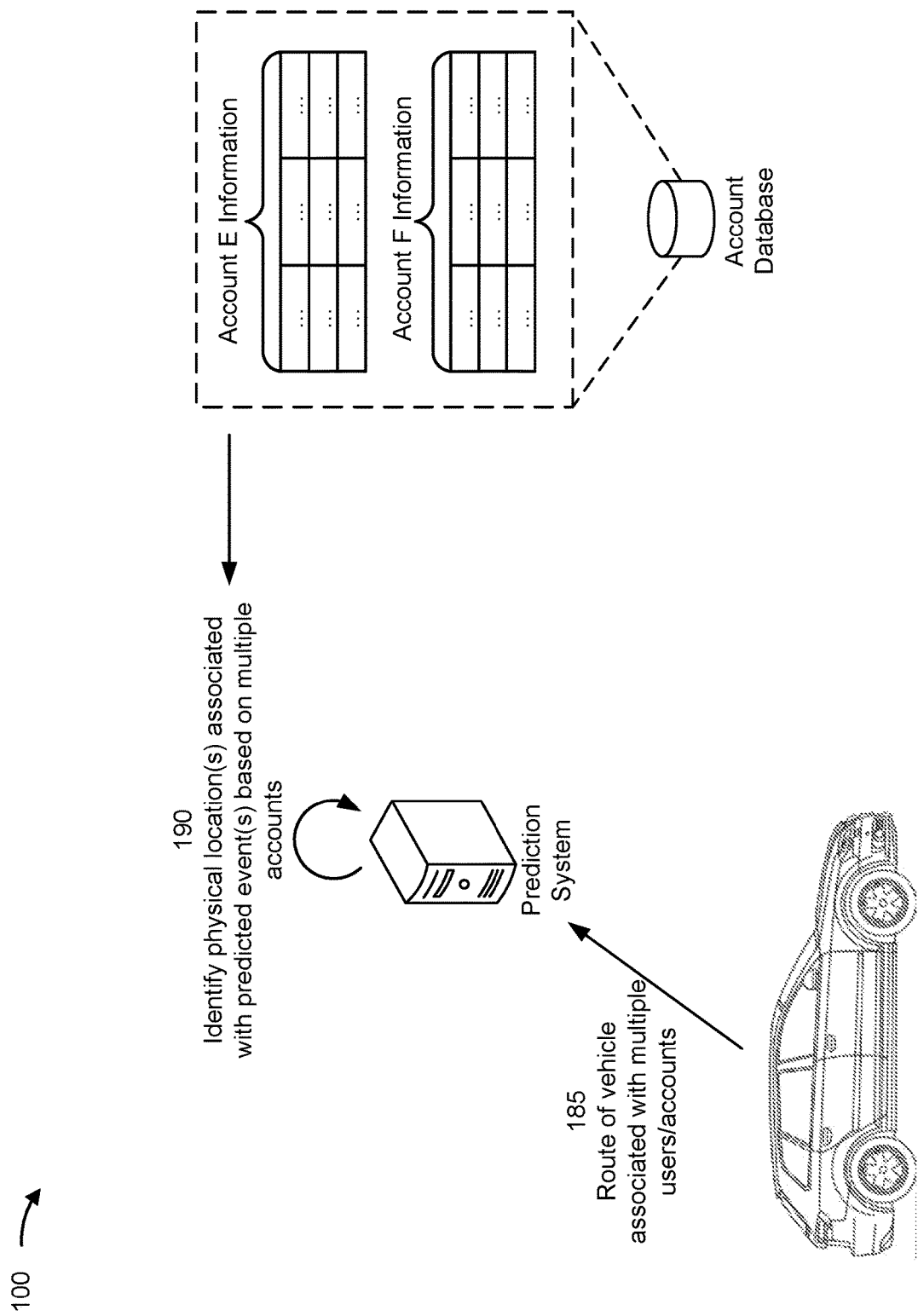

As shown in FIG. 1D, in some implementations, the prediction system may use account information associated with multiple accounts and/or multiple users to recommend one or more waypoints. As shown by reference number 185, the prediction system may receive an indication of a route of a vehicle associated with multiple users and/or multiple accounts, in a similar manner as described above in connection with FIG. 1C. For example, in addition to receiving route information (e.g., a starting location and ending location) from a user device and/or navigation system, the prediction system may receive information that identifies multiple users being carried in the vehicle. For example, the prediction system may receive multiple user identifiers, with different user identifiers corresponding to different passengers in the vehicle. The prediction system may receive the user identifiers from one or more user devices and/or from a navigation system.

In some implementations, if there are multiple users in the vehicle, then the prediction system may refrain from recommending a waypoint, as described above in connection with FIG. 1C, so as not to inconvenience one passenger for the sake of another. Alternatively, as shown by reference number 190, the prediction system may identify a predicted event and/or a physical location corresponding to each user, in a similar manner as described above in connection with a single user. In some implementations, if the physical locations identified for more than one user are the same physical location or are within a threshold proximity of one another, then the prediction system may generate and transmit a new route that includes the starting location, the physical locations as waypoints, and the ending location.

As an example, the prediction system may perform one or more operations described in connection with FIGS. 1A-1B to identify patterns of events for multiple users and/or accounts associated with those users (e.g., a first pattern of events or a first series of recurring events for a first user, a second pattern of events or a second series of recurring events for a second user, and so on), and may store account information for each user in the account database (e.g., first account information for the first user, second account information for the second user, and so on). As described elsewhere herein, account information may include transaction data (e.g., the data shown and described in connection with FIGS. 1A and 1B) and/or information derived from transaction data (e.g., a time between events or transactions, a standard deviation determined for times between events or transactions, or other statistical data about the transaction data). The prediction system may perform one or more operations described in connection with FIG. 1C to generate predicted information for multiple users and/or accounts associated with those users (e.g., a first predicted event, a first time period for the first predicted event, and/or a first physical location for the first predicted event for a first user; a second predicted event, a second time period for the second predicted event, and/or a second physical location for the second predicted event for a second user, and so on).

Based on receiving an indication that the vehicle is carrying a first user and a second user and that the vehicle is to travel a route during a time period, the prediction system may identify a first physical location for a first predicted event that is predicted to occur within the time period in association with the first user. The prediction system may also identify a second physical location for a second predicted event that is predicted to occur within the time period in association with the second user. In some implementations, the first predicted event may be associated with a first time period, which may be the same as or different from a second time period associated with the second predicted event. For the prediction system to recommend the first physical location and the second physical location as waypoints, the first time period and the second time period may at least partially overlap (or may fully overlap), and the time at which the vehicle is to travel the route may occur within the overlapping time period.

In some implementations, if the prediction system determines that the first physical location and the second physical location are not the same physical location, then the prediction system may refrain from recommending either of the first physical location or the second physical as waypoints along the route, and may refrain from generating a route that includes either of the first physical location or the second physical location. In this example, if the prediction system determines that the first physical location and the second physical location are the same physical location (e.g., the same ATM, the same bank, the same grocery store, the same dry cleaner, the same restaurant, or the like), then the prediction system may generate a new route that includes the starting location, that physical location as a waypoint (e.g., the first physical location and the second physical location, which are the same single physical location), and the ending location.

Additionally, or alternatively, if the prediction system determines that the first physical location and the second physical location are not within a threshold proximity of one another, then the prediction system may refrain from recommending either of the first physical location or the second physical as waypoints along the route, and may refrain from generating a route that includes either of the first physical location or the second physical location. The threshold proximity may be a threshold distance between physical locations (e.g., in a straight line or along a route of travel) or a threshold amount of travel time between physical locations. In this example, if the prediction system determines that the first physical location and the second physical location are within a threshold proximity of one another (but are not the same physical location), then the prediction system may generate a new route that includes the starting location, the first physical location as a first waypoint, the second physical location as a second waypoint, and the ending location. Alternatively, the prediction system may determine an intermediate waypoint that is not at the first physical location or the second location (e.g., that is somewhere between the first physical location and the second physical location), and may use that intermediate waypoint in the route rather than the first physical location and the second physical location. For example, if the first physical location and the second physical location are in the same shopping center, then the intermediate waypoint may be a point located between the physical locations (e.g., a parking spot), such that both users can exit the vehicle, visit the respective physical locations, and return to the vehicle.

In this way, computing resources (e.g., memory resources, processing resources, and/or battery power) of the navigation system may be conserved as compared to calculating routes for separate trips, wear and tear on the vehicle may be reduced as compared to making separate trips, and energy needed to fuel the vehicle may be conserved. In some implementations, the prediction system may use machine learning to generate accurate and relevant predictions, which may conserve network resources used to transmit information that identifies a recommend waypoint as compared to a system that generates less accurate predictions and transmits corresponding recommendations more often.

As indicated above, FIGS. 1A-1D are provided as an example. Other examples may differ from what is described with regard to FIGS. 1A-1D.

Figure 2:
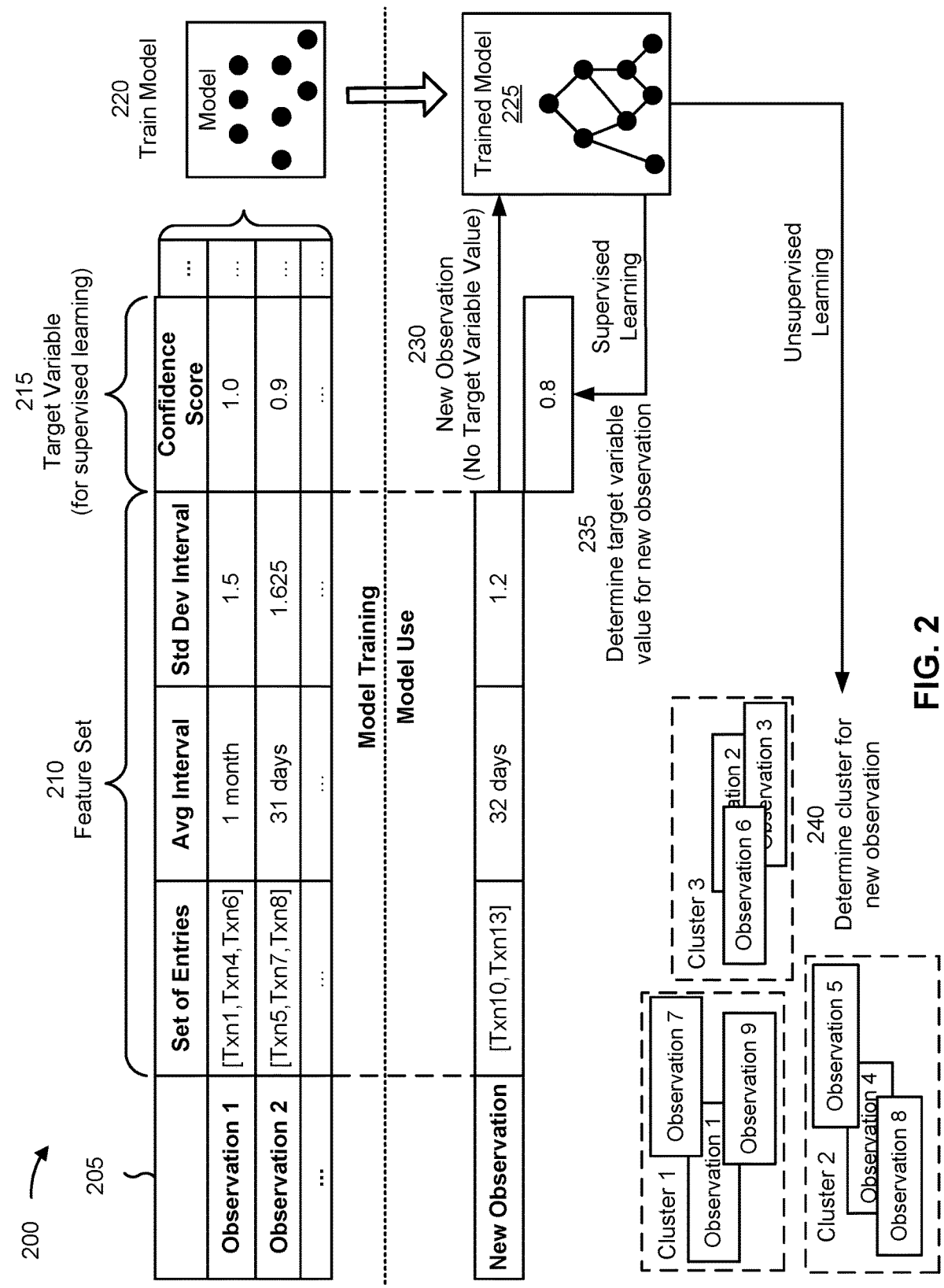
FIG. 2 is a diagram illustrating an example of training and using a machine learning model in connection with identifying patterns of events for waypoint identification.

FIG. 2 is a diagram illustrating an example 200 of training and using a machine learning model in connection with identifying patterns of events for waypoint identification. The machine learning model training and usage described herein may be performed using a machine learning system. The machine learning system may include or may be included in a computing device, a server, a cloud computing environment, or the like, such as the prediction system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from a storage system, a historical event database, a current event database, and/or an account database, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a storage system, a historical event database, a current event database, and/or an account database. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a set of transaction entries (e.g., of transaction data that is labeled as being associated with a pattern of transactions or a series of recurring transactions), a second feature of an average interval of time between transactions associated with the pattern or series, a third feature of a standard deviation of the average interval of time, and so on. As shown, for a first observation, the first feature may have a value of [Txn1, Txn4, Txn6], the second feature may have a value of 1 month, the third feature may have a value of 1.5, and so on. These features and feature values are provided as examples, and may differ in other examples. For example, the feature set may include one or more of the following features: a time (e.g., an average time) between events included in a pattern of events or a series of recurring events, a standard deviation determined for times between events included in the pattern of events or the series of recurring events, an entity associated with the pattern of events or the series of recurring events, an entity category associated with the pattern of events or the series of recurring events, and/or any account information (e.g., transaction data) described above in connection with FIGS. 1A and 1B.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is confidence score (e.g., that indicates a degree of confidence that the set of entries is associated with a pattern of events or a series of recurring events), which has a value of 1.0 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of [Txn10, Txn13], a second feature of 32 days, a third feature of 1.2, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 0.8 for the target variable of a confidence score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first automated action may include, for example, predicting an event (e.g., a next event) associated with a pattern of events or a series of recurring events, identifying a predicted date associated with the predicted event, and/or identifying a physical location associated with the predicted event.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a cluster with a high likelihood of being associated with a pattern or series of events), then the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a cluster with a low likelihood of being associated with a pattern or series of events), then the machine learning system may refrain from performing the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determine whether a set of entries is associated with a pattern or series of events. The machine learning system enables recognition and/or identification of tens, hundreds, thousands, or millions of features and/or feature values for tens, hundreds, thousands, or millions of observations, thereby increasing accuracy and consistency and reducing delay associated with determining whether a set of entries is associated with a pattern or series of events relative to requiring computing resources to be allocated for tens, hundreds, or thousands of operators to manually determine whether a set of entries is associated with a pattern or series of events using the features or feature values. While some implementations described herein in relation to FIG. 2 are directed to determining whether a set of entries is associated with a series of recurring events, the description provided herein in relation to FIG. 2 applies to training and using a machine learning model to generate predicted information (e.g., that includes a predicted event, a predicted time period and/or a physical location), as described herein in relation to FIGS. 1A-1D. For example, any of the account information (e.g., transaction data) shown in FIGS. 1A and 1B may be used in the feature set for generating such a prediction.

As indicated above, FIG. 2 is provided as an example. Other examples may differ from what is described in connection with FIG. 2.

Figure 3:
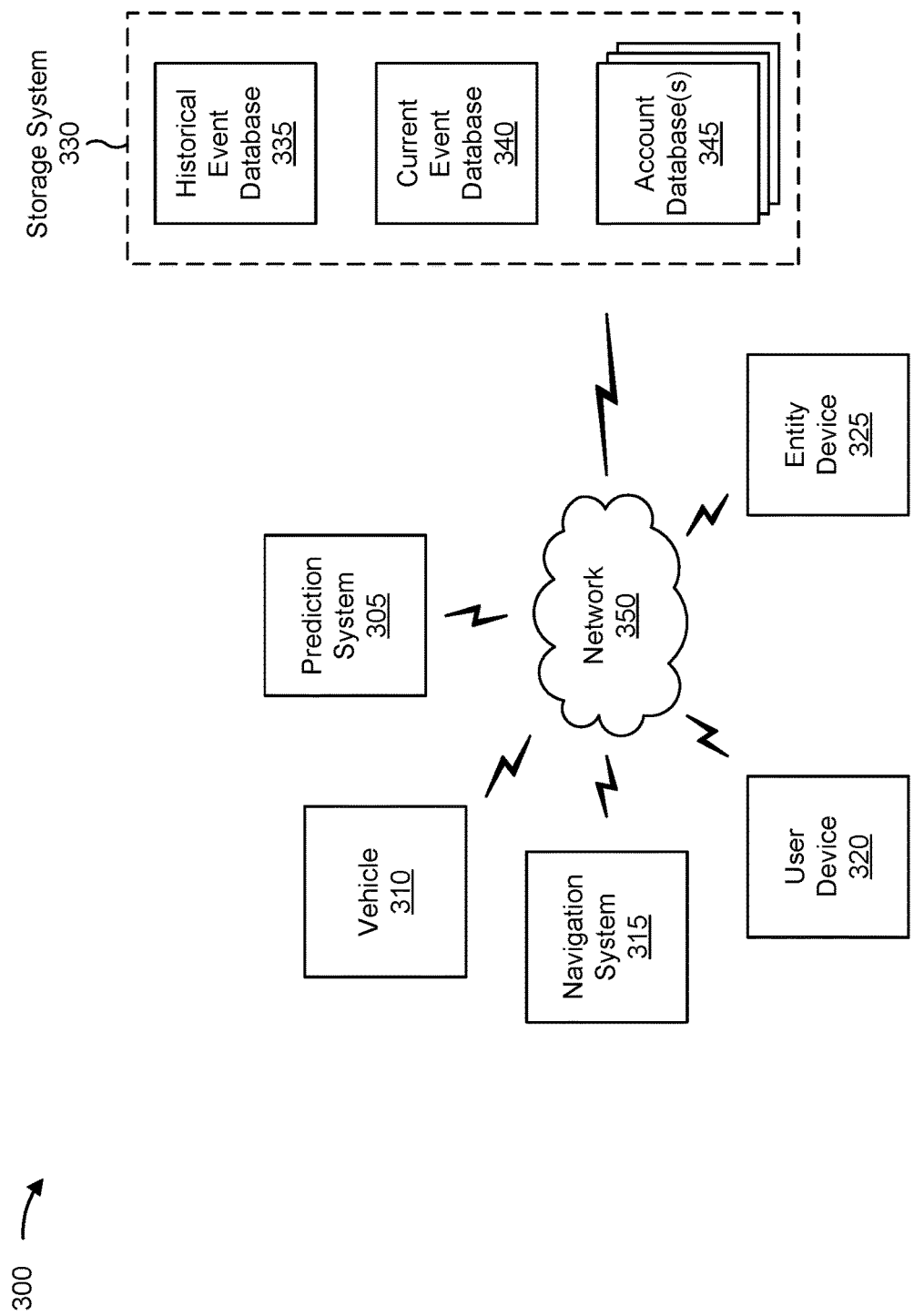
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a prediction system 305, a vehicle 310, a navigation system 315, a user device 320, an entity device 325, a storage system 330 (e.g., that may include one or more of a historical event database 335, a current event database 340, and/or one or more account databases 345), and a network 350. Devices of environment 300 may interconnect via wired connections, wireless connections, or a combination of wired and wireless connections.

The prediction system 305 includes one or more devices capable of receiving, generating, storing, processing, and/or providing information associated with identifying event patterns, predicting events, and/or identifying waypoints based on one or more predicted events, as described elsewhere herein. The prediction system 305 may include a communication device and/or a computing device. For example, the prediction system 305 may include a server, an application server, a client server, a web server, a database server, a host server, a proxy server, a virtual server (e. g., executing on computing hardware), a device that includes computing hardware used in a cloud computing environment, or a similar type of device.

The vehicle 310 includes any type of vehicle capable of travelling a route. For example, vehicle 310 may include an automobile, a car, a truck, a motorcycle, a scooter, a boat, an airplane, a bicycle, or the like. In some implementations, the vehicle 310 may include one or more communication components (e.g., one or more wireless communication components and/or one or more wired communication components) to communicate with one or more other devices of FIG. 3. For example, the vehicle 310 may include a wireless wide area network communication component to communicate with a radio access network to communicate with the prediction system 305 and/or the navigation system 315. As another example, the vehicle 310 may include a local area network communication component (e.g., a WiFi communication component), a personal area network communication component (e.g., a Bluetooth communication component), and/or a wired communication component (e.g., a Universal Serial Bus communication component and/or a car area network communication component) to communicate with the navigation system 315 and/or the user device 320.

The navigation system 315 includes one or more devices capable of determining and/or outputting route information for navigating a route, as described elsewhere herein. For example, the navigation system may include a GNSS device, a GPS device, or the like. In some implementations, the navigation system 315 is integrated into the vehicle 310 (e.g., into a dashboard of the vehicle 310). Additionally, or alternatively, the navigation system 315 may be integrated into the user device 320.

The user device 320 includes one or more devices capable of receiving, generating, storing, processing, and/or providing information associated with navigating a route, as described elsewhere herein. The user device 320 may include a communication device and/or a computing device. For example, the user device 320 may include a wireless communication device, a mobile phone, a user equipment, a laptop computer, a tablet computer, a gaming console, a wearable communication device (e.g., a smart wristwatch, a pair of smart eyeglasses, a head mounted display, or a virtual reality headset), or a similar type of device.

The entity device 325 includes one or more devices capable of receiving, generating, storing, processing, and/or providing information associated with identifying a vehicle and/or a user, as described elsewhere herein. In some implementations, the entity device 325 may be capable of authenticating a vehicle and/or a user. For example, the entity device 325 may include a server, an ATM, an authentication device, a radio frequency identifier (RFID) reader, a camera equipped with computer vision, a biometric authentication device, or the like.

The storage system 330 includes one or more devices capable of receiving, generating, storing, processing, and/or providing information associated with events (e.g., transactions) and/or predicted events, as described elsewhere herein. The storage system 330 may include a communication device and/or a computing device. For example, the storage system 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the storage system 330 may include the historical event database 335, the current event database 340, and/or the one or more account databases 345, as described elsewhere herein.

The network 350 includes one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

Figure 4:
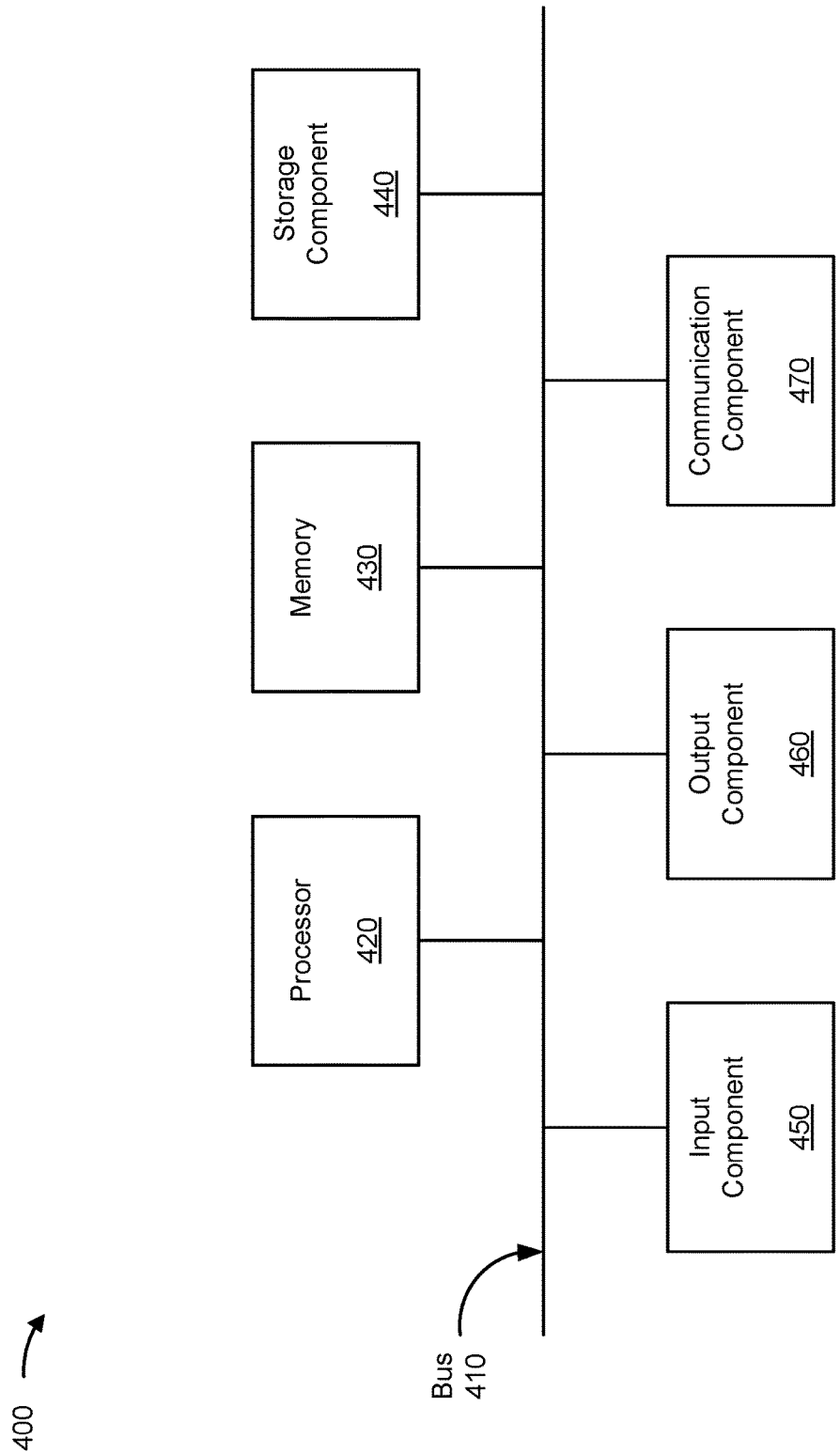
FIG. 4 is a diagram of example components of one or more devices of FIG. 3.

FIG. 4 is a diagram of example components of a device 400, which may correspond to the prediction system 305, one or more components of the vehicle 310, the navigation system 315, the user device 320, the entity device 325, the storage system 330, the historical event database 335, the current event database 340, and/or the account database 345. In some implementations, the prediction system 305, one or more components of the vehicle 310, the navigation system 315, the user device 320, the entity device 325, the storage system 330, the historical event database 335, the current event database 340, and/or the account database 345 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with waypoint identification in association with route navigation. In some implementations, one or more process blocks of FIG. 5 may be performed by a prediction system (e.g., prediction system 305). In some implementations, one or more process blocks of FIG. 5 may be performed by another device or a group of devices separate from or including the prediction system, such as the vehicle 310, the navigation system 315, and/or the user device 320. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include identifying, using a machine learning model, a pattern of events associated with an account of a user (block 510). As further shown in FIG. 5, process 500 may include generating a prediction of a time period during which a predicted event, associated with the pattern of events, is predicted to occur (block 520). As further shown in FIG. 5, process 500 may include receiving an indication that a vehicle, associated with the user, is to travel a route from a starting location to an ending location during the time period (block 530). As further shown in FIG. 5, process 500 may include identifying a physical location associated with the predicted event based on a location associated with the vehicle (block 540). As further shown in FIG. 5, process 500 may include generating a new route that includes the starting location, the physical location as a waypoint along the new route, and the ending location (block 550). As further shown in FIG. 5, process 500 may include transmitting information that identifies the new route to a device associated with the vehicle (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for waypoint identification in association with route navigation, the system comprising:
one or more memories; and
one or more processors, communicatively coupled to the one or more memories, configured to:
identify, using a machine learning model, a first series of recurring events associated with an account of a first user;
identify, using the machine learning model, a second series of recurring events associated with an account of a second user;
generate a prediction of a first time period during which a first predicted event, associated with the first series of recurring events, is predicted to occur;
generate a prediction of a second time period during which a second predicted event, associated with the second series of recurring events, is predicted to occur,
wherein the first time period and the second time period at least partially overlap;
receive an indication that a vehicle, associated with the first user and the second user, is to travel a route from a starting location to an ending location during the at least partially overlapping time period;
identify a first physical location, associated with the first predicted event, based on a location of the vehicle;
identify a second physical location, associated with the second predicted event, based on the location of the vehicle;
generate a new route that includes the starting location, the first physical location and the second physical location as waypoints along the new route, and the ending location;
determine that the new route satisfies a condition; and
transmit information that identifies the new route to a device associated with the vehicle based on determining that the new route satisfies the condition.

2. The system of claim 1, wherein the machine learning model identifies the first series of recurring events based on a feature set that includes at least one of:
an average time between events included in the first series of recurring events,
a standard deviation determined for times between events included in the first series of recurring events,
an entity associated with the first series of recurring events, or
an entity category associated with the first series of recurring events.

3. The system of claim 1, wherein the condition is that a difference between a first travel time of the route and a second travel time of the new route is less than or equal to a threshold.

4. The system of claim 1, wherein the first series of recurring events is a series of recurring transactions, the first predicted event is a predicted transaction, and the first physical location is associated with an entity that is associated with the predicted transaction.

5. The system of claim 1, wherein the one or more processors are further configured to transmit an identifier, associated with the vehicle, the first user, or the second user, to a device associated with the first physical location or the second physical location to assist with performing an action in connection with the first predicted event or the second predicted event.

6. The system of claim 1, wherein the condition is that the first physical location and the second physical location are within a threshold proximity of one another.

7. The system of claim 1, wherein the first physical location and the second physical location are the same physical location.

8. The system of claim 1, wherein the one or more processors are further configured to:
determine, based on the first physical location and the second physical location, an intermediate waypoint, wherein the intermediate waypoint is not at the first physical location or the second physical location, and
generate the new route, wherein the new route includes the intermediate waypoint as a waypoint along the new route.

9. A method for waypoint identification in association with route navigation, comprising:
identifying, by a system and using a machine learning model, a first pattern of events based on account information associated with a first user;
identifying, by the system and using the machine learning model, a second pattern of events based on account information associated with a second user;
generating, by the system, a prediction of a first time period during which a first predicted event, associated with the first pattern of events, is predicted to occur;
generating, by the system, a prediction of a second time period during which a second predicted event, associated with the second pattern of events, is predicted to occur,
wherein the first time period and the second time period at least partially overlap;
receiving, by the system, an indication that a vehicle, associated with the first user and the second user, is to travel a route from a starting location to an ending location during the at least partially overlapping time period;
identifying, by the system, a first physical location associated with the first predicted event based on a location associated with the vehicle or based on the route;
identifying, by the system, a second physical location associated with the second predicted event based on the location associated with the vehicle or based on the route;
generating, by the system, a new route that includes the starting location, the first physical location and the second physical location as waypoints along the new route, and the ending location; and
transmitting, by the system, information that identifies the new route to a device associated with the vehicle.

10. The method of claim 9, wherein the account information associated with the first user includes at least one of:
a time between events included in the first pattern of events,
a standard deviation determined for times between events included in the first pattern of events,
an entity associated with the first pattern of events, or
an entity category associated with the first pattern of events.

11. The method of claim 9, wherein the first pattern of events is a pattern of transactions associated with an entity, the first predicted event is a predicted transaction with the entity, and the first physical location is associated with the entity.

12. The method of claim 9, wherein the first pattern of events is a pattern of transactions associated with a set of entities included in an entity category, the first predicted event is a predicted transaction with the entity category, and the first physical location is associated with an entity included in the set of entities.

13. The method of claim 9, wherein transmitting the information that identifies the new route is based on determining that the first physical location and the second physical location are within a threshold proximity of one another.

14. A non-transitory computer-readable medium storing a set of instructions, the set of instructions comprising:
one or more instructions that, when executed by one or more processors of a system, cause the system to:
identify, using a machine learning model, a first pattern of events associated with an account of a first user;
identify, using the machine learning model, a second pattern of events associated with an account of a second user;
generate a prediction of a first time period during which a first predicted event, associated with the first pattern of events, is predicted to occur;
generate a prediction of a second time period during which a second predicted event, associated with the second pattern of events, is predicted to occur, wherein the first time period and the second time period at least partially overlap;
receive an indication that a vehicle, associated with the first user and the second user, is to travel a route from a starting location to an ending location during the at least partially overlapping time period;
identify a first physical location associated with the first predicted event based on a location associated with the vehicle;
identify a second physical location associated with the second predicted event based on the location associated with the vehicle;
generate a new route that includes the starting location, the first physical location and the second physical location as waypoints along the new route, and the ending location; and
transmit information that identifies the new route to a device associated with the vehicle.

15. The non-transitory computer-readable medium of claim 14, wherein the machine learning model identifies the first pattern of events based on a feature set that includes at least one of:
a time between events included in the first pattern of events,
a standard deviation determined for times between events included in the first pattern of events,
an entity associated with the first pattern of events, or
an entity category associated with the first pattern of events.

16. The non-transitory computer-readable medium of claim 14, wherein the first pattern of events is a pattern of transactions associated with one or more entities, the first predicted event is a predicted transaction with the one or more entities, and the first physical location is associated with an entity of the one or more entities.

17. The non-transitory computer-readable medium of claim 14, wherein the one or more instructions, when executed by the one or more processors, further cause the system to:
determine that a first condition, associated with generating the new route, is satisfied, wherein the new route is generated based on determining that the first condition is satisfied.

18. The non-transitory computer-readable medium of claim 17, wherein the first condition is based on at least one of the ending location or an estimated time of arrival at the ending location using the route.

19. The non-transitory computer-readable medium of claim 17, wherein the one or more instructions, when executed by the one or more processors, further cause the system to:
determine that a second condition, associated with transmitting the information that identifies the new route, is satisfied, wherein the information that identifies the new route is transmitted to the device associated with the vehicle based on determining that the first condition and the second condition are satisfied.

20. The non-transitory computer-readable medium of claim 19, wherein the second condition is that a difference between a first travel time of the route and a second travel time of the new route is less than or equal to a threshold.

* * * * *